UNITED STATES PATENT OFFICE.

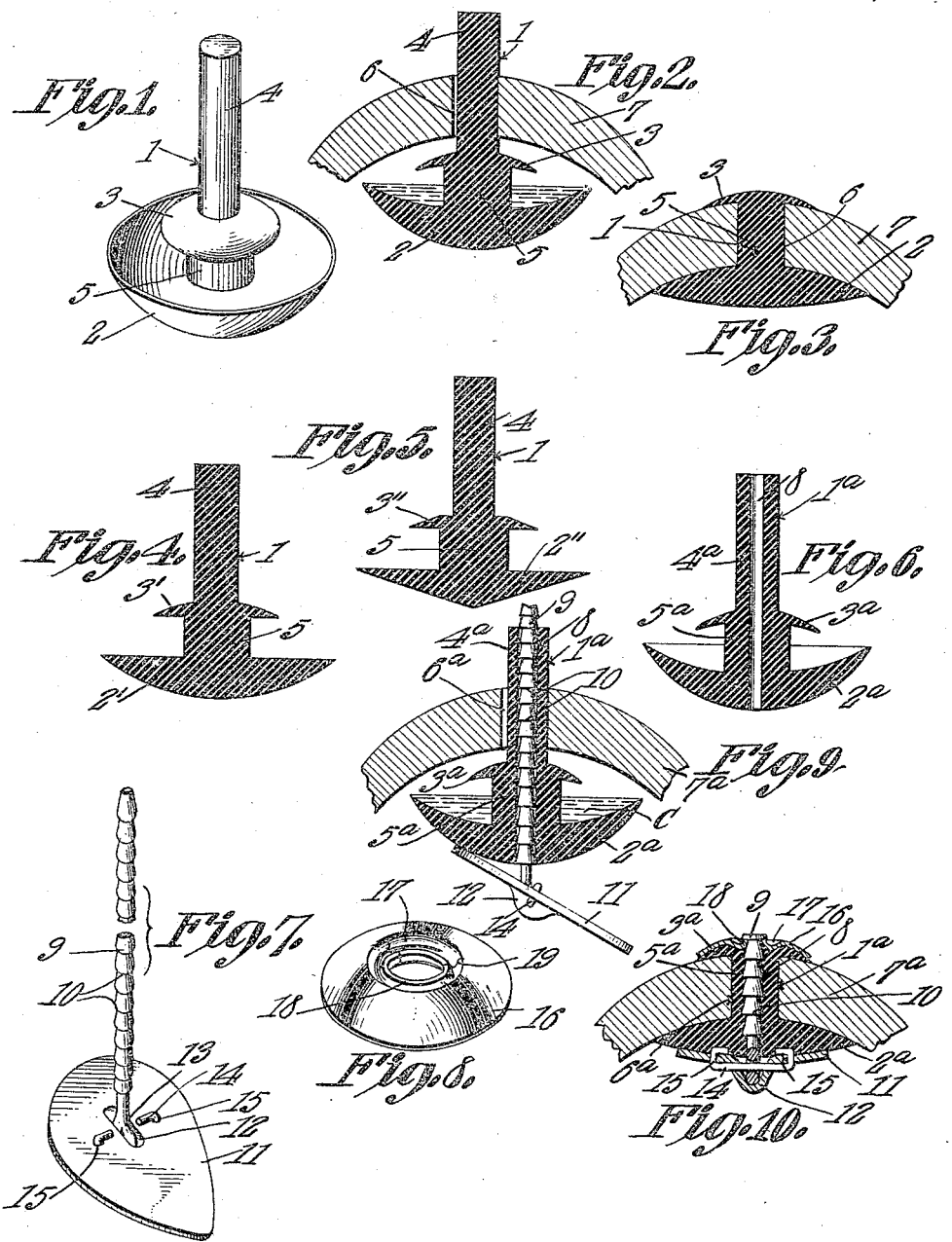

LLOYD V. ROOD, OF MARIETTA, OHIO.

TIRE-PLUG.

1,188,998.  Specification of Letters Patent.  Patented June 27, 1916.

Application filed January 26, 1915. Serial No. 4,511.

*To all whom it may concern:*

Be it known that I, LLOYD V. ROOD, a citizen of the United States, residing at Marietta, in the county of Washington and State of Ohio, have invented a new and useful Tire-Plug, of which the following is a specification.

The present invention appertains to tire plugs, and is an improvement over the tire plug disclosed in my co-pending application, Serial No. 845,668, filed June 17, 1914.

This invention has for its object, the provision of a tire plug of unique construction, whereby it may be conveniently applied to a pneumatic tire for plugging or stopping up the puncture therein, in an effective and desirable manner, and whereby the puncture will not be liable to be reopened even though the tire is subjected to hard usage.

The invention also aims to provide a tire plug which will not only thoroughly seal the puncture, but which will also prevent the tire from being cut or injured by the plug, and furthermore, it is the object of the invention to provide a plug which will be simple and inexpensive in construction, and convenient, practical, serviceable and efficient in the use thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in several different forms in the accompanying drawing.

Figure 1 is a perspective view of one form of plug. Fig. 2 is a longitudinal section of the plug illustrating the same inserted through the puncture of a tire and in a position to receive the cement. Fig. 3 is a sectional view of the plug in final position for stopping up the puncture. Figs. 4 and 5 are sectional views illustrating modified forms of the plug, but which are employed in the same manner as the form of plug illustrated in Figs. 1, 2 and 3. Fig. 6 is a sectional view of another variation which is employed in connection with a metallic clamping device. Fig. 7 is a perspective view of the metallic clamping device, a portion thereof being broken away. Fig. 8 is an enlarged perspective view of the washer employed in the metallic clamping device. Fig. 9 is a sectional view of the form of plug illustrated in Fig. 6 inserted through the puncture of the tire in connection with the metallic clamping device. Fig. 10 is a sectional view illustrating the parts of Fig. 9 in final position with the washer applied and the parts finished off.

Referring specifically to Figs. 1, 2 and 3, the form of plug illustrated therein is constructed of one piece of rubber or other pliant, flexible and elastic material, and comprises a stem or shank 1 having a base or closer 2 at one end, and a cap or retaining member 3 between its ends and adjacent the base or closer 2. The base or closer 2 and the cap or retaining member 3 are of circular outline and are of relatively large and small diameters. The base 2 and cap 3 are also of mushroom shape, or are concave-convexed in form, with their concaved faces or sides facing one another. That portion of the stem or shank 1 designated 4, which projects or protrudes from the cap 3 is of relatively small diameter and is relatively long while the portion 5 of the stem between the base 2 and cap 3 is relatively short and is of relatively large diameter, but is of smaller diameter than the cap 3. The said parts are molded or otherwise formed in an integral or unitary structure, and it is essential that they be formed of suitable rubber or other material whereby the portion 5 of the stem between the base 2 and cap 3 is elastic, while the base 2 and cap 3 are pliant or flexible. In practice, it being understood that the plug may be constructed in various sizes and the projecting or free portion 4 of the stem is of a diameter approximately the same or slightly smaller than the puncture or opening 6 in the tire 7, whereas the portion 5 of the stem is of larger diameter than the puncture or opening 6, and is shorter than the thickness of the tread portion of the tire. The base 2 is designed to fit the interior of the tire and the cap 3 is designed to overlap the tread or exterior of the tire while the portion 5 of the stem is intended to fill up the puncture or opening in the tire.

The plug is used as follows: When the proper size of plug is selected, according to the size of puncture or opening in the tire, the plug is inserted through the puncture with the base 2 innermost, so that the base 2 and cap 3 are disposed within the tire, while the free portion 4 of the stem projects through the puncture 6 to the exterior, to be held by the fingers. Then, the cement may be injected in any suitable manner through the puncture and will flow downwardly along the stem 1 and around the cap 3 onto the base or closer 2 and the base being of cup or dish-shaped formation will catch and hold the cement. When sufficient cement has been injected through the puncture, the stem 1 of the plug is drawn forcibly outward, to pull the cap or retaining member 3 of the plug outwardly through the puncture, it being noted that the formation of the cap 3 will enable it to flex and pass readily through the puncture. The base or closer 2 will then be pulled snugly against the interior of the tread portion of the tire or tire casing 7, and the portion 4 of the stem being pulled outward will cause the portion 5 of the stem to be stretched sufficiently in order that the cap 3 will overlap the tread portion of the tire or tire casing, as seen in Fig. 3. Thus, the portion 5 of the stem will be brought under tension and in tending to contract will hold the base or closer 2 and cap or retaining member 3 tightly against the inner and outer portions of the tire and will tend to compress that portion of the tire surrounding the puncture 6, to cause the walls of the puncture to embrace the portion 5 of the stem. The cement, during the movement of the plug to final position, will be forced to all portions between the plug and tire, whereby the parts will be caused to adhere to one another when the cement sets, although it is to be understood that the present device may in some instances be employed without the use of cement, since the plug will in itself form a complete seal for the puncture. Then, after the plug has been pulled to final position with the base or closer 2 and cap or retaining member 3 overlapping the inner and outer portions of the tire or tire casing, as seen in Fig. 3, the free portion 4 of the stem is cut off adjacent or flush with the cap 3, to remove the objectionable projection, and to leave nothing but the cap or retaining member 3 upon the outside of the tire which is not objectionable. It is to be noted that the foregoing plug constitutes but one piece of rubber, and no metallic parts are employed, and that the plug may be readily and effectively applied to the tire for closing the puncture. The plug is simple and inexpensive to manufacture, and may be applied to the tire by the inexperienced or unskilled as well as by the skilled mechanic.

In the second form of the invention, illustrated in Fig. 4, the construction is the same as in the first form, with the exception that the base or closer 2' and the cap or retaining element 3' are of plano-convexed contour, and have their plane faces disposed adjacent one another.

In the third form of the invention, depicted in Fig. 5, the general form of the plug is the same as in the first two forms, with the exception that the base or closer 2'' is of conical shape while the cap or retaining member 3'' is of frusto-conical shape. The forms of plugs illustrated in Figs. 4 and 5 may be employed in the same manner as above described in connection with the first form of plug.

The fourth form of plug, delineated in Fig. 6, is of the same shape as the plug illustrated in Figs. 1 and 2, and the parts have been designated by the same reference characters with the suffix "a" added thereto, and it being noted that the stem 1$^a$ is provided with a longitudinal bore or passage 8 extending completely therethrough and through the base or closer 2$^a$, whereby the plug may be employed in connection with the metallic clamping device illustrated in Fig. 7.

The metallic clamping device embodies a metallic stem 9 having a longitudinal series of transverse or annular corrugations forming a longitudinal series of shoulders 10, and a head 11 of oval contour is pivotally carried by one end of the stem 9. The head 11 is preferably constructed of steel and has a central downstruck portion 12 which receives the eye 13 formed upon the lower end of the stem 9. The head 11 and stem 9 are pivoted together by means of a staple, pin or other pivot element 14 engaged through the sides of the downstruck portion 12 and passing through the eye 13, the end portions of the staple, pin or retaining element 14 being engaged upwardly through apertures 15 formed in the head 11 at the sides of the downstruck portion 12 and overlapping the head 11, as clearly seen in Figs. 7 and 10.

A washer 16 is adapted to be slipped upon the stem 9 and is provided with a depressed portion 17 at the center thereof and with a recurved portion 18 surrounding the aperture of the washer. The recurved portion or lip 18 is resilient or flexible, and is preferably made so by cutting slits 19 in the depressed portion 17 of the washer and extending to the aperture thereof. The washer is so constructed as to be slipped over the stem 9, in order that the lip or portion 18 of the washer will snap over and engage under the shoulders 10 of the stem for holding the washer against movement away from the head after the washer has been applied to the stem.

In using the fourth form of plug and the metallic clamping device, the head 11 of the clamping device is first inserted through the puncture 6ª of the tire or tire casing 7ª, reference being had to Figs. 9 and 10, so that the stem 9 projects outwardly through the puncture 6ª to be held by the fingers. It is to be noted that the head 11 being pivoted to the lower end of the stem 9 may be swung against the stem 9 or toward the axis thereof, so that the head 11 and stem 9 may be readily inserted through the puncture, and in order that the head 11 may then swing at an angle to the stem 9 after the head 11 has entered the tire. The rubber plug is then slipped down over the stem 9, the parts being properly held during this operation, and the plug is then forced down through the puncture or opening 6ª to the position illustrated in Fig. 9, and which resembles the position of the first form of plug illustrated in Fig. 2. Thus, the stem 9 will project upwardly through the bore or passage 8 of the plug, and the head 11 will lie below the base or closer 2ª of the plug, while the stem or shank 1ª of the plug will project through the puncture 6ª with the stem 9. The cement, if cement is employed, is then injected through the puncture and runs down along the stem 1ª and around the cap or retaining element 3ª, to be caught by the base or closer 2ª, as at C. The stems 1ª and 9 are then drawn outwardly, to pull the cap 3ª through the puncture, and to pull the portion 5ª of the plug stem within the puncture, the same as with the first form of plug. After the cap 3ª is pulled onto the tread of the tire, to overlap the same, and thereby hold the plug in puncture closing position, the free portion of the stem 1ª is cut off adjacent or flush with the cap or retaining element 3ª. The washer 16 is then slipped down over the stem 9 of the metallic clamping device, and is forced down slightly upon the cap or retaining element 3ª, and at the same time, the stem is pulled outward, to compress the plug between the head 11 and washer 16 and to thereby assist in holding the base or closer 2ª and the cap or retaining element 3ª against the tire or tire casing. After the washer 16 is properly applied and moved to final position, the stem 9 is severed adjacent the washer 16, as seen in Fig. 10, and which will finally trim or finish off the plug. In this form of the invention, there are combined the advantages of the plug illustrated in Figs. 1 and 2, with the metallic clamping device, and as a result a most effective closure for the puncture is provided. The metallic parts are spaced from the tire or tire casing by the rubber plug to prevent the metallic parts from injuring the tire or tire casing, it being noted that the washer 16 is of smaller diameter or area than the cap or retaining element 3ª, while the head 11 is of smaller contour than the base or closer 2ª. The washer 16 may also be threaded upon the stem 9, as in ordinary metallic tire plugs if desired, but the use of the washer 16 and stem 9 herein disclosed is much quicker and efficient.

From the foregoing, taken in connection with the drawing, it is believed that the advantages and capabilities of the present device will be obvious to those versed in the art, it being noted that the several forms of the device have common and individual features, due to the common and specific constructions thereof, respectively.

Having thus described the invention, what is claimed as new is:—

1. The combination with a one part tire plug comprising a stem having a closer, a retaining member and a longitudinal bore therethrough, of a clamping device embodying a stem adapted to extend through the said bore and having a head at one end to seat against the closer, and a washer adapted to be slipped upon the last mentioned stem and to seat against the retaining member, the last mentioned stem and washer having interengageable portions for holding the washer in place.

2. The combination with a one part tire plug comprising a stem having a pliant closer at one end, a retaining member between its ends, an elastic portion between the closer and retaining member and a longitudinal bore extending therethrough, of a clamping device embodying a stem to project through the said bore and having a head at one end to bear against the closer, and a washer engageable to the last mentioned stem and adapted to bear against the retaining member when the first mentioned stem is cut off adjacent the retaining member.

3. A repair plug for tires, comprising an elastic body having a flanged head, a stem having an enlarged portion slightly in advance of said head, a contracted neck between said head and enlarged portion, the plug as a whole having a bore extending axially through said head and stem, a metal bolt or keeper extending through said perforation, and a metal cap attached thereto for securing said plug in place.

4. A repair plug for tires, comprising an elastic body having a head, a stem, an enlarged portion upon said stem, a neck between said head and enlarged portion, the plug as a whole having a bore extending axially through said elastic body, a metal bolt extending through said plug and having a dished head, and a metal cap to engage with said bolt, said cap having an inwardly projecting cone shaped central portion.

In testimony that I claim the foregoing as my own, I have hereto affixed my signature in the presence of two witnesses.

LLOYD V. ROOD.

Witnesses:
GEORGE L. YOUNG,
EDW. A. BLUME.

Copies of this patent may be obtained for five cents each, by addressing the "Commissioner of Patents, Washington, D. C."